United States Patent
Guyot et al.

(10) Patent No.: US 8,838,841 B2
(45) Date of Patent: Sep. 16, 2014

(54) METHOD AND STRUCTURE ENABLING IMPROVED NATIVE COMMAND QUEUEING IN A DATA STORAGE DEVICE

(75) Inventors: Cyril Guyot, San Jose, CA (US); Timothy K. Tsai, Santa Clara, CA (US)

(73) Assignee: HGST Netherlands B.V., Amsterdam (NL)

( * ) Notice: Subject to any disclaimer, the term of this patent is extended or adjusted under 35 U.S.C. 154(b) by 11 days.

(21) Appl. No.: 13/561,156

(22) Filed: Jul. 30, 2012

(65) Prior Publication Data
US 2014/0032788 A1     Jan. 30, 2014

(51) Int. Cl.
*G06F 3/00*     (2006.01)

(52) U.S. Cl.
USPC ............................................... 710/6; 710/58

(58) Field of Classification Search
None
See application file for complete search history.

(56) References Cited

U.S. PATENT DOCUMENTS

| | | | |
|---|---|---|---|
| 5,991,825 A | 11/1999 | Ng | |
| 7,124,276 B2 * | 10/2006 | Pullen et al. | 711/210 |
| 7,373,460 B2 | 5/2008 | Kobayashi et al. | |
| 7,471,486 B1 * | 12/2008 | Coker et al. | 360/78.06 |
| 2005/0055517 A1 * | 3/2005 | Olds et al. | 711/158 |
| 2006/0129716 A1 | 6/2006 | Saito et al. | |
| 2007/0005896 A1 * | 1/2007 | Chang et al. | 711/120 |
| 2008/0098170 A1 | 4/2008 | Guthrie et al. | |
| 2012/0304027 A1 * | 11/2012 | Stenfort | 714/57 |

* cited by examiner

*Primary Examiner* — Elias Mamo

(57) ABSTRACT

A data storage device accepts read and write commands with absolute command completion times based on queue-depth-of-one (qd=1) execution and stores them in an unsequenced commands memory. These commands are requests to access the data storage device and contain both locations on the storage medium where the data is located and whether the requested operation is read or write. For each pair of first and second commands in the memory, the time between execution of the first command and the second command is calculated and stored. A command selector then reads data from the memory based on a resequencing NCQ algorithm which inserts one or more commands from the command memory into the original qd=1 sequence whenever this insertion will not affect the execution time of commands in the original qd=1 sequence. The resequencing algorithm of the present invention increases IOPS and reduced read head actuator travel and wear.

20 Claims, 17 Drawing Sheets

| | | | R | 0.535 | 0.533 | 0.317 | 0.017 | 0.643 | 0.748 | 0.368 | 0.537 | 0.900 | 0.194 | 0.657 | 0.609 |
|---|---|---|---|---|---|---|---|---|---|---|---|---|---|---|---|
| R | A | | A | 167 | 68 | 211 | 163 | 185 | 339 | 2 | 16 | 50 | 51 | 352 | 135 |
| (a.u.) | (deg) | | | C0 | C1 | C2 | C3 | C4 | C5 | C6 | C7 | C8 | C9 | C10 | C11 |
| 0.535 | 167 | C0 | | | 5.8 | 9.0 | 15.9 | 8.4 | 11.8 | 4.3 | 4.6 | 13.4 | 13.4 | 4.1 | 7.3 |
| 0.533 | 68 | C1 | | 2.2 | | 11.2 | 18.1 | 10.6 | 6.0 | 6.5 | 6.8 | 15.6 | 15.6 | 6.3 | 9.5 |
| 0.317 | 211 | C2 | | 7.0 | 12.8 | | 14.9 | 15.4 | 10.9 | 3.4 | 11.7 | 20.4 | 4.5 | 11.1 | 14.3 |
| 0.017 | 163 | C3 | | 16.1 | 13.9 | 9.1 | | 16.5 | 19.9 | 12.4 | 12.7 | 21.5 | 5.5 | 20.2 | 15.4 |
| 0.643 | 185 | C4 | | 7.6 | 5.4 | 8.6 | 15.5 | | 3.4 | 11.9 | 4.2 | 13.0 | 13.0 | 3.7 | 6.9 |
| 0.748 | 339 | C5 | | 12.2 | 10.0 | 13.1 | 20.1 | 4.6 | | 16.5 | 8.8 | 9.6 | 17.6 | 8.3 | 3.5 |
| 0.368 | 2 | C6 | | 11.7 | 9.5 | 4.6 | 11.6 | 12.1 | 15.5 | | 8.3 | 17.1 | 9.1 | 7.8 | 11.0 |
| 0.537 | 16 | C7 | | 3.4 | 1.2 | 12.3 | 19.3 | 3.8 | 7.2 | 7.7 | | 8.8 | 8.8 | 7.5 | 2.6 |
| 0.900 | 50 | C8 | | 10.6 | 16.4 | 19.6 | 26.5 | 11.0 | 6.4 | 14.9 | 15.2 | | 24.0 | 6.7 | 9.9 |
| 0.194 | 51 | C9 | | 10.6 | 8.4 | 3.5 | 10.5 | 11.0 | 14.4 | 6.9 | 15.2 | 24.0 | | 14.7 | 17.9 |
| 0.657 | 352 | C10 | | 3.9 | 9.7 | 12.9 | 19.8 | 4.3 | 7.7 | 8.2 | 8.5 | 9.3 | 17.3 | | 3.2 |
| 0.609 | 135 | C11 | | 8.7 | 6.5 | 9.7 | 16.6 | 1.1 | 4.5 | 13.0 | 5.4 | 14.1 | 14.1 | 4.8 | |

400 →

*PRIOR ART*

| COMMAND # = | 0 | 1 | 2 | 3 | 4 | 5 | 6 | 7 | 8 | 9 | 10 | 11 |
|---|---|---|---|---|---|---|---|---|---|---|---|---|
| R = | 0.535 | 0.533 | 0.317 | 0.017 | 0.643 | 0.748 | 0.368 | 0.537 | 0.900 | 0.194 | 0.657 | 0.609 |
| Cumulative A (deg) = | 167 | 428 | 931 | 1603 | 2345 | 2499 | 3242 | 3616 | 4010 | 5091 | 5752 | 5895 |
| Cumulative Time (ms) = | 0.0 | 5.8 | 17.0 | 31.9 | 48.4 | 51.8 | 68.3 | 76.6 | 85.4 | 109.4 | 124.1 | 127.3 |
| Time (ms) = | 0.0 | 5.8 | 11.2 | 14.9 | 16.5 | 3.4 | 16.5 | 8.3 | 8.8 | 24.0 | 14.7 | 3.2 |
| Angle (deg) = | 167 | 68 | 211 | 163 | 185 | 339 | 2 | 16 | 50 | 51 | 352 | 135 |

*PRIOR ART*

| COMMAND # = | 0 | 10 | 11 | 4 | 5 | 7 | 1 | 6 | 2 | 9 | 3 | 8 |
|---|---|---|---|---|---|---|---|---|---|---|---|---|
| R = | 0.535 | 0.657 | 0.609 | 0.643 | 0.748 | 0.537 | 0.533 | 0.368 | 0.317 | 0.194 | 0.017 | 0.900 |
| Cumulative A (deg) = | 167 | 352 | 495 | 545 | 699 | 1096 | 1148 | 1442 | 1651 | 1851 | 2323 | 3290 |
| Cumulative Time (ms) = | 0.0 | 4.1 | 7.3 | 8.4 | 11.8 | 20.6 | 21.8 | 28.3 | 33.0 | 37.4 | 47.9 | 69.4 |
| Time (ms) = | 0.0 | 4.1 | 3.2 | 1.1 | 3.4 | 8.8 | 1.2 | 6.5 | 4.6 | 4.5 | 10.5 | 21.5 |
| Angle (deg) = | 167 | 352 | 135 | 185 | 339 | 16 | 68 | 2 | 211 | 51 | 163 | 50 |

| COMMAND # = | 0 | 7 | 1 | 2 | 6 | 3 | 9 | 4 | 5 | 8 | 10 | 11 |
|---|---|---|---|---|---|---|---|---|---|---|---|---|
| R = | 0.535 | 0.537 | 0.533 | 0.317 | 0.368 | 0.017 | 0.194 | 0.643 | 0.748 | 0.900 | 0.657 | 0.609 |
| Cumulative A (deg) = | 167 | 376 | 428 | 931 | 1082 | 1603 | 1851 | 2345 | 2499 | 2930 | 3232 | 3533 |
| Cumulative Time (ms) = | 0.0 | 4.6 | 5.8 | 17.0 | 20.3 | 31.9 | 37.4 | 48.4 | 51.8 | 61.4 | 68.1 | 74.8 |
| Time (ms) = | 0.0 | 4.6 | 1.2 | 11.2 | 3.4 | 11.6 | 5.5 | 11.0 | 3.4 | 9.6 | 6.7 | 6.7 |
| Angle (deg) = | 167 | 16 | 68 | 211 | 2 | 163 | 51 | 185 | 339 | 50 | 352 | 135 |

| | 0 | 1 | 2 | 3 | 4 | 5 | 6 | 7 | 8 | 9 | 10 | 11 |
|---|---|---|---|---|---|---|---|---|---|---|---|---|
| qd=1 CCT (ms) = | 0.0 | 5.8 | 17.0 | 31.9 | 48.4 | 51.8 | 68.3 | 76.6 | 85.4 | 109.4 | 124.1 | 127.3 |
| greedy CCT (ms) = | 0.0 | 21.8 | 33.0 | 47.9 | 8.4 | 11.8 | 28.3 | 20.6 | 69.4 | 37.4 | 4.1 | 7.3 |
| invention CCT (ms) = | 0.0 | 4.6 | 17.0 | 31.9 | 48.4 | 51.8 | 20.3 | 4.6 | 61.4 | 37.4 | 68.1 | 74.8 |

METHOD AND STRUCTURE ENABLING IMPROVED NATIVE COMMAND QUEUEING IN A DATA STORAGE DEVICE

TECHNICAL FIELD OF THE INVENTION

The present invention relates to data storage devices, and in particular to data storage devices that accept queued read and write commands wherein absolute command completion times and an absence of lost commands are preferred.

BACKGROUND OF THE INVENTION

The present invention relates to data storage devices employing rotating data storage media, or other data storage systems characterized by data accessing times which are appreciable in comparison with modern processing speeds (GHz). Data is transferred to, and read from, the storage medium according to commands, Ci, which specify the locations of the data on the storage medium, and also whether data is to be written on, or read from, these locations. A number of commands (typically 32, but can be 128 or more) may be stored in a command queue, from which the data storage device reads individual commands in a certain order for execution. Due to physical limits on the rotational speeds of the storage media (typically thousands of rpm) and the radial accelerations and decelerations of the read head (determining seek times), an opportunity for improving data access rates (measured in Input/Output Operations Per Second, or IOPS) presents itself in the form of algorithms for executing commands in a different order from which they were received.

One common prior art command accessing sequence is termed a "queue-depth-of one" (qd=1) rotational position ordering (RPO) native command queuing (NCQ) algorithm. For this algorithm, the command queue is first-in-first-out (FIFO). Advantages of this method are:
1) All commands have an absolute command completion time (CCT),
2) No commands are "lost" or substantially delayed.

Unfortunately, disadvantages of this method are:
1) IOPS values tend to be lower than for non-qd=1 methods,
2) Head travel tends to be substantially increased due to typically large read head motions, potentially inducing more wear to the actuator mechanism and reduced device lifetimes or more maintenance.

Thus it would be advantageous to achieve guaranteed absolute command execution times without increasing the host system workload while achieving increased IOPS. It would also be advantageous to reduce the total head travel to reduce wear on the actuator mechanism, thereby increasing device lifetimes and reducing maintenance.

SUMMARY OF THE INVENTION

According to some embodiments of the present invention, a data storage device receives read and write commands which are saved in an unsequenced command memory. A time-distance calculator determines the time-distances between all pairs of commands in the unsequenced command memory. A command selector then receives these time-distances and executes the NCQ algorithm of the present invention having the following aspects:
1) All commands are executed no later than they would have executed using a q=1 prior art NCQ algorithm,
2) If possible, without delaying execution of the next command that would be executed using a qd=1 NCQ algorithm, one or more commands are executed out of the normal qd=1 sequence,
3) No commands are lost or subject to substantial execution delays, eliminating a problem characteristic of the faster greedy NCQ algorithms,
4) IOPS is guaranteed to be at least that of a qd=1 algorithm, and in most cases will be improved, although not typically to the levels of greedy NCQ algorithms.

In some embodiments, the NCQ algorithm of the present invention may be employed for some data processing applications where the above performance aspects would be sbeneficial, while for other data processing applications not requiring these aspects, other NCQ algorithms such as greedy, or traveling salesman, might be applied with the same hardware configuration which embodies the NCQ of the present invention.

Although the present invention is discussed largely in the context of hard disk drives, the present invention may also apply to other types of data storage devices including network storage devices, solid-state non-volatile memories (e.g., Flash memories), and still remain within the scope and spirit of the present invention.

BRIEF DESCRIPTION OF THE DRAWINGS

FIG. 4 is a table illustrating execution of a prior art qd=1 NCQ algorithm based on the time-distance values in FIG. 3;

FIG. 5 is a table illustrating execution of a prior art greedy NCQ algorithm based on the time-distance values in FIG. 3;

FIG. 6 is a table illustrating execution of an NCQ algorithm according to the present invention based on the time-distance values in FIG. 3;

FIG. 15 is a table illustrating command completion times for three NCQ algorithms;

DETAILED DESCRIPTION OF PREFERRED EMBODIMENTS

Embodiments of the invention can provide one or more advantages over prior art NCQ algorithms. Not all embodiments may provide all the benefits. In all cases, however, absolute command completion times are assured for all commands and the probability of "losing" commands due to re-sequencing is zero.

Radius-Angle Plot Notation

Figure 1:
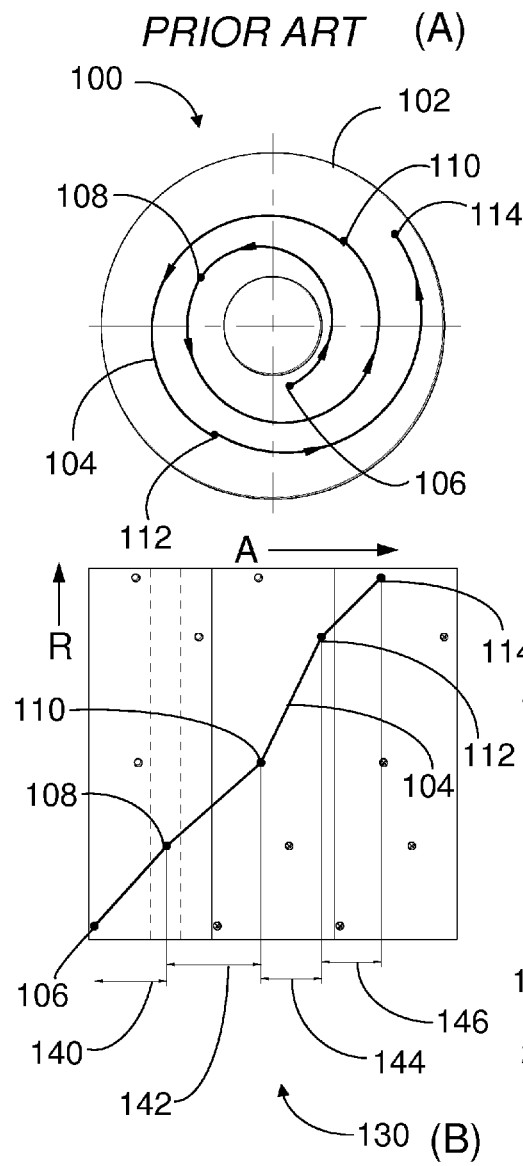
FIG. 1 is a schematic diagram of a prior art disk storage device executing a qd=1 native command queuing (NCQ) algorithm.

FIG. 1 is a schematic diagram of a prior art disk storage 100 device executing a qd=1 rotational position ordering (RPO) native command queuing (NCQ) algorithm. In view (A), a circular data storage medium 102 is illustrated, containing five data locations 106, 108, 110, 112, and 114, at various radii R and angles A, as shown in the "R-A" plot 130 in view (B). In the various figures to follow, extensive use is made of R-A plots which are essentially a "folded-out" view of the rotating disk, in most cases illustrating a plurality of 0° to 360° consecutive rotations. In this illustration, the R-A plot extends from 0° at the left to 3×360°=1080°, or three full turns of the storage medium 102. As can be seen in view (B), all five data locations 106, 108, 110, 112, and 114, are repeated three times, once for each turn of medium 102 (left to right in the diagram). The prior art queue depth of one (qd=1) NCQ algorithm always results in a strictly FIFO sequence for command execution, i.e., commands are always executed in the order they were received, which in this example is 106, 108, 110, 112, and 114, as illustrated by trajectory 104. Angle 140 corresponds to the rotation angle of medium 102 between commands 106 and 108. Similarly, angles 142, 144, and 146, correspond to the rotation angles of medium 102 from command 108 to 110, from 110 to 112, and from 112 to 114. In the remainder of this description, the term "command" will refer to the location (specified as a radius and angle) on medium 102 where data is to be either read from, or written to. Thus locations 106, 108, 110, 112, and 114 could be referred to as commands C0, C1, C2, C3, and C4, respectively.

In a qd=1 native command queuing (NCQ) algorithm, as illustrated here, commands are executed in first-in-first-out (FIFO) order: C0, C1, C2, C3, and C4. Advantages of a qd=1 NCQ algorithm are:

1) Guaranteed absolute command completion times (CCTs), based on the relative time-distance between successive commands. For example, between commands i and j, the time-distance would be $d(C_i,C_j)$, assuming there are no missed rotations. In the event of a missed rotation (assuming there is no re-sequencing of commands performed, as in, for example, U.S. Pat. No. 5,991,825), the time-distance between commands i and j would be increased by exactly one rotation time, $T_R$, of the data storage medium 102.

2) Guaranteed no loss of commands due to omission by the NCQ algorithm. This can be a problem with greedy NCQ algorithms, as described below in FIGS. 5, 11, and 12, below.

Figure 2:
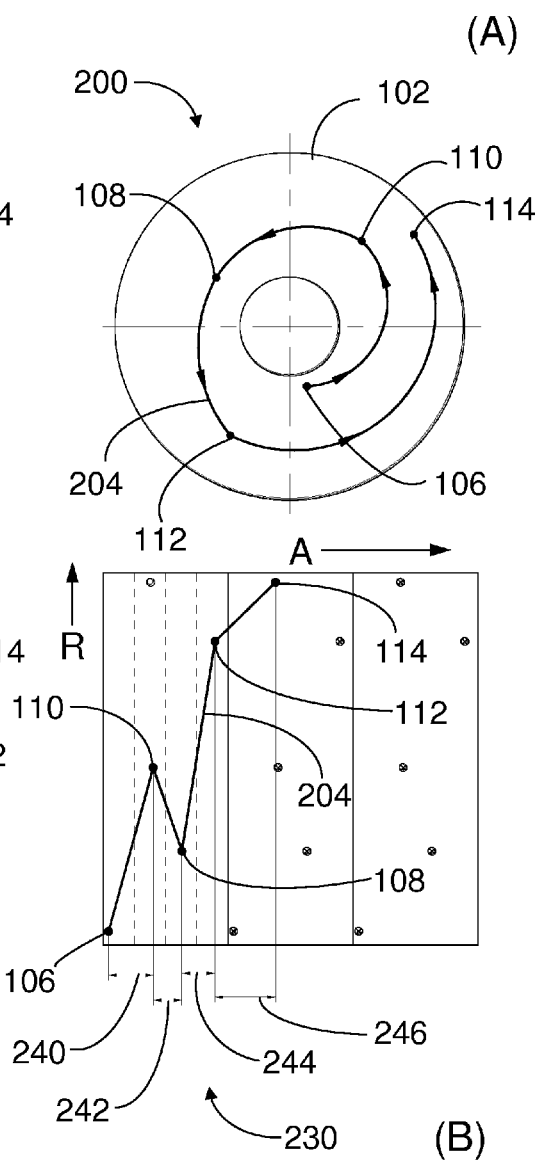
FIG. 2 is a schematic diagram of a disk storage device executing a rotational position ordering NCQ algorithm according to the invention.

FIG. 2 is a schematic diagram of a disk storage device 200 executing an NCQ algorithm according to the invention. The same medium 102 is illustrated, containing the same five commands C0 to C4. The trajectory 204 has been generated by the NCQ algorithm of the present invention. To reduce the total execution time for all five commands, the command execution sequence has been optimized to C0, C2, C1, C3, and C4, where the order of commands C1 and C2 has been reversed from FIG. 1. As shown, now commands C3 and C4 can be executed on the first and second rotations, respectively, of medium 102, instead of on the second and third rotations, respectively, for the qd=1 NCQ algorithm in FIG. 1. This represents a total time savings equal to the time for a full rotation of medium 102, which may be on the order of 8 ms for a 7200 rpm rotational speed in a typical data storage device. Angle 240 corresponds to the rotation angle from C0 to C2, angle 242 is from C2 to C1, angle 244 is from C1 to C3, and angle 246 is from C3 to C4. Angle 246 has the same value as angle 146 in FIG. 1, but occurs one rotation earlier than angle 146 due to the decrease in the sum of angles 240, 242, and 244, compared with the sum of angles 140, 142 and 144 in FIG. 1.

Comparison of views (A) in FIGS. 1 and 2 clearly demonstrates the benefits of re-sequencing of commands C1 and C2—trajectory 104 comprises about 2.3 rotations, while trajectory 204 comprises only about 1.3 rotations of data storage medium 102.

Table of Time-Distances for Commands C0 to C11

Figure 3:
FIG. 3 is a table of time-distance values for a queue containing 11 commands.

FIG. 3 is table 300 of time-distance values $d(C_i,C_j)$ for a queue containing 11 commands C1, . . . , C11, where i,j=0, . . . , 11. Note that command C0 is assumed to have just executed. This table is for illustrative purposes only since the following simplifying assumptions have been made:

1) A fixed number (11) of commands are executed, with no additional commands being received during execution of C1-C11, i.e., the queue is emptied.
2) A constant head velocity is assumed, either radially outwards or inwards, with essentially instant acceleration to full speed and instant deceleration back to zero speed. This has the effect of allowing some commands which are close together radially to be executed without the need for a rotation between them when, with realistic assumptions for acceleration and deceleration, they would require a full turn in-between.
3) The seek time is assumed to be 24 s, so along with 2), above, it takes exactly three full turns of the storage disk to go across the full head radial range.
4) The rotational time is assumed to be 8 ms, corresponding to approximately 7200 rpm.

The (R,A) locations of commands C0-C11 are plotted for two full rotations (FIG. 9) and for seventeen rotations (FIGS. 10, 12, and 14) of the data storage medium. Based on geometrical considerations, FIG. 3 demonstrates that $d(C_i,C_j) + d(C_j,C_i) = N\,T_R$, where N is a positive integer and $T_R$ is the time for one rotation of the storage medium. Down the left side of table 300, the (R,A) locations of C0-C11 as origin commands are shown. Across the top of table 300, the same (R,A) locations correspond to C0-C11 as destination commands. Thus the time-distance value for $d(C_4,C_8)$ is seen to be 13.0 ms. Obviously, $d(C_i,C_i)$ values are not required and thus are left blank. FIGS. 4-6 draw on $d(C_i,C_j)$ values from table 300.

Prior Art qd=1 NCQ Algorithm

Figure 10:
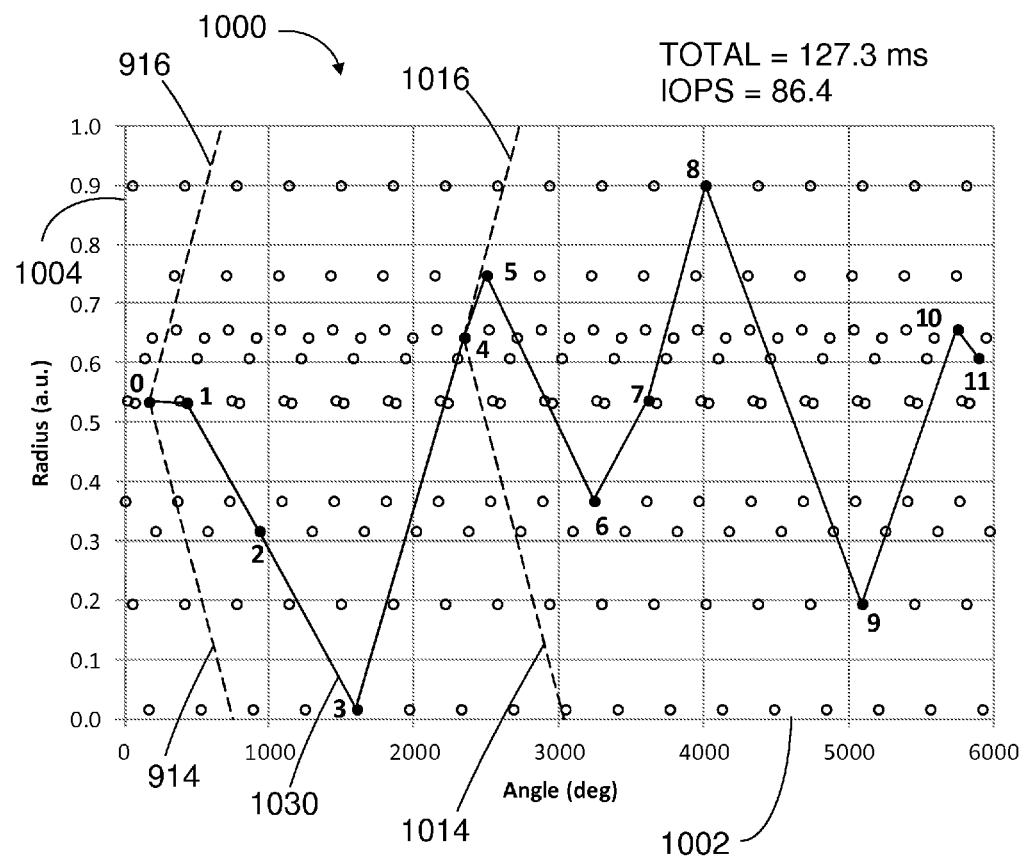
FIG. 10 is a Radius-Angle plot corresponding to execution of a prior art qd=1 NCQ algorithm.

FIG. 4 is a table 400 illustrating execution of a prior art qd=1 NCQ algorithm based on table 300 of time-distance values. For a qd=1 NCQ algorithm, commands are executed in FIFO order: C0, C1, C2, . . . , C10, C11. Some of the limitations of this simple simulation do not affect the results for this example since it is unimportant that no additional commands are received during execution of C1-C11 because any additional commands: C12, C13, . . . , would always be executed after commands C1-C11. The top line of table 400 shows the order of commands being executed. Below each command label, Ci, the radius Ri and angle Ai are shown, along with the time between commands, the cumulative angle and the cumulative time, which in this example corresponds to the cumulative angle times the inverse of the angular velocity 0.022 ms/deg for an 8 ms rotation time. The time-distance values 5.8, 11.2, . . . , 3.2 ms may be read off of table 300 as the times just above the blank diagonal cells, corresponding to d(Ci, Ci+1). In this example, the time to execute eleven commands is 127.3 ms. The trajectory between commands (i.e., data locations on the storage medium) is shown in FIG. 10, where the inefficiency of the qd=1 NCQ algorithm is apparent, requiring almost seventeen rotations to execute only eleven commands.

Prior Art "Greedy" NCQ Algorithm

FIG. 5 is a table 500 illustrating execution of a prior art "greedy" NCQ algorithm based on the table 300 of time-distance values. A "greedy" NCQ algorithm is characterized in that for any origin command Ci, the minimum d(Ci,Cj) value is determined out of the full range of unexecuted commands Cj in the command queue, and then the Cj command corresponding to this minimum d(Ci,Cj) value is executed next. A greedy NCQ algorithm has the advantage of enabling substantially shorter total command execution times in many cases, but with two significant disadvantages:

1) It is not possible to ensure when any particular command will be executed, and although some may be executed sooner than with a qd=1 approach, others may execute substantially later, as shown in FIG. 15,
2) In some cases, commands may even be missed or delayed an extremely long time (i.e., seconds) since they are never the best choice for next execution based on the criterion of minimizing d(Ci,Cj). This disadvantage may be partially overcome through the addition of "aging" to commands, wherein after a certain period in the queue, a command Cj is given a higher priority than other commands which might have smaller d(Ci,Cj) values.

Figure 11:
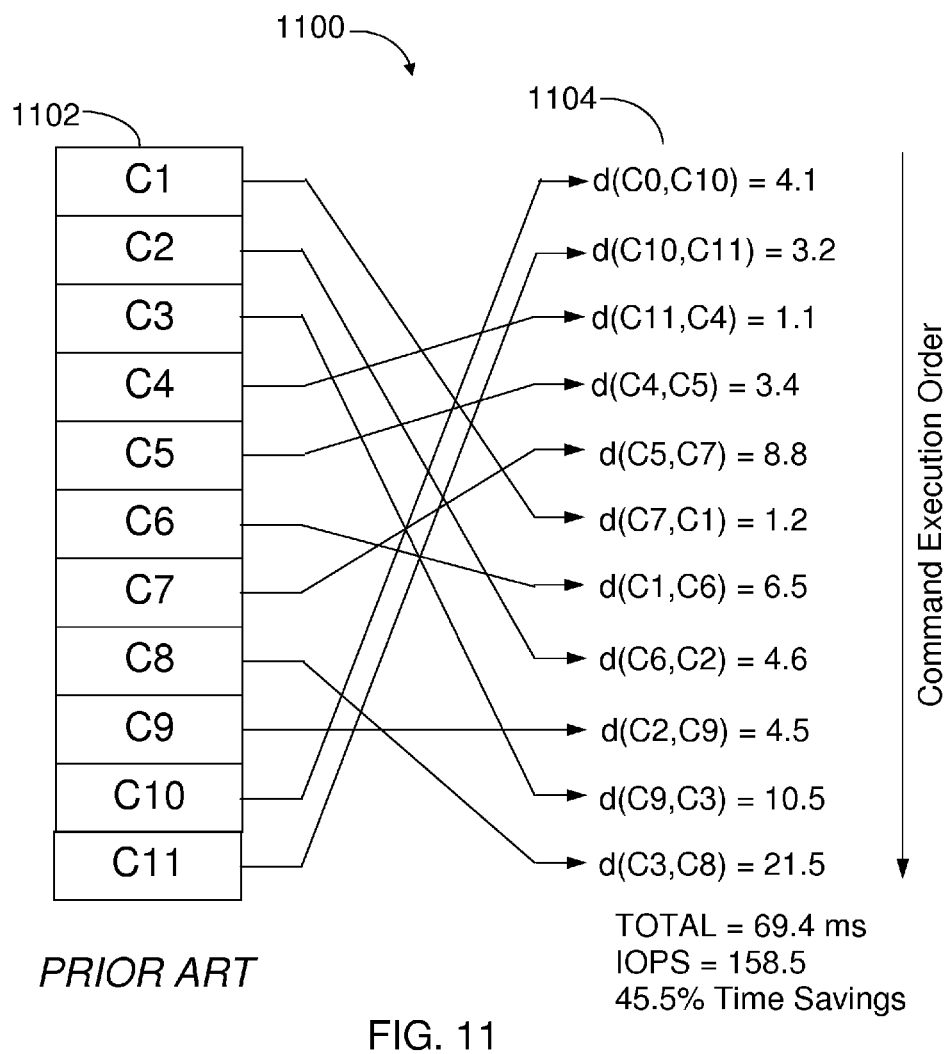
FIG. 11 illustrates the sequencing of commands when executing a prior art greedy NCQ algorithm.
Figure 12:
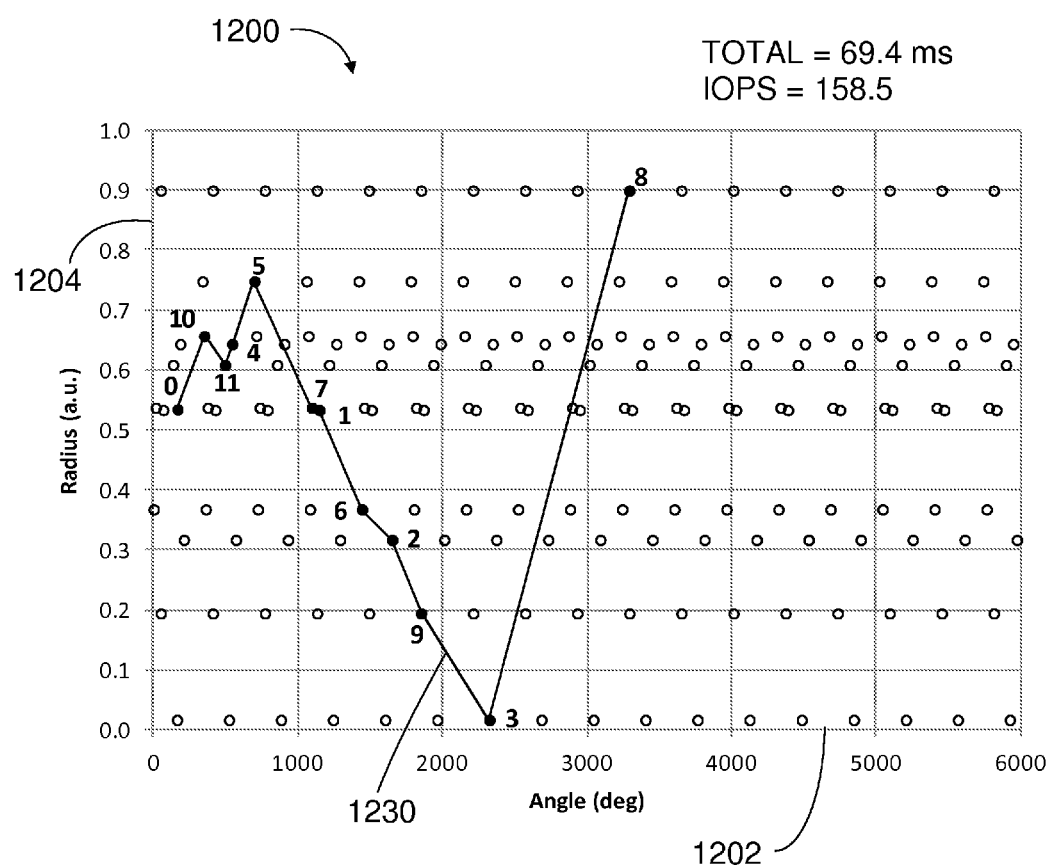
FIG. 12 is a Radius-Angle plot corresponding to execution of a prior art NCQ greedy algorithm.

The command execution sequence in table 500 is shown along the top row to be: C0, C10, C11, C4, C5, C7, C1, C6, C2, C9, C3, C8—substantially different than the C0, C1, . . . , C11 qd=1 sequence in table 400. As a result of this "greedy" re-sequencing of commands, the total command execution time has been reduced from 127.3 ms to 69.4 ms, a 45.5% reduction, corresponding to an increase in IOPS from 86.4 to 158.8. FIGS. 11 and 12 illustrate these results further. As a result of not adding any more commands to the initial set C0-C11, there is some distortion in these results, since if new commands C12, C13, had arrived before the later commands (e.g., C9-C11), there would in many cases have been further command re-sequencing, possibly causing one or more of the later commands to be seriously delayed in execution. Obviously, where no additional commands are added to the queue, the problem of "losing" commands cannot occur—this can be seen by the longer CCTs for C10-C11 in table 500, indicating that these commands benefited by no new commands having entered the queue which might have had smaller CCTs. Comparison of the much smaller CCTs for the earlier commands, such as 1.1 ms for C4 and 1.2 ms for C1 confirms this conclusion.

NCQ Algorithm According to the Present Invention

FIG. 6 is a table 600 illustrating execution of an NCQ algorithm according to the present invention based on the table 300 of time-distance values. This algorithm executes commands in a FIFO sequence, unless there are one or more other commands Ci, Cj, . . . which can be executed out of this sequence but without delaying execution of command Cnext, where Cnext is chosen according to a qd=1 NCQ algorithm. Thus the NCQ algorithm of the present invention has the following two key advantages over prior art greedy NCQ algorithms:

1) All commands have an absolute Command Completion Time (CCT) which is never longer than for a qd=1 NCQ algorithm, and in many cases may be substantially reduced from a qd=1 CCT,
2) No commands are ever "lost" or substantially delayed.

The command execution sequence for the present invention illustrated in table 600 is: C0, C7, C1, C2, C6, C3, C9, C4, C5, C8, C10, C11—substantially different than produced by either the qd=1 or greedy NCQ algorithms in tables 400 and 500, respectively. Closer examination shows that C7 has been inserted before C1, C6 is before C3, and C9 is before C4, so even within only eleven commands, the NCQ algorithm of the present invention has introduced three command re-sequencings relative to a qd=1 NCQ algorithm. The total command execution time is 74.8 ms, not quite as good as for the greedy NCQ algorithm (69.4 ms), but still improved over the qd=1 case by 41.2%, giving an IOPS of 147.1. Note that these IOPS comparisons should be taken as exemplary but not quantitative due to the constraints of the simple model as highlighted above. Further discussion of these results is provided in FIGS. 13-15.

Statistical Distributions of IOPS for the Three NCQ Algorithms

Figure 7:
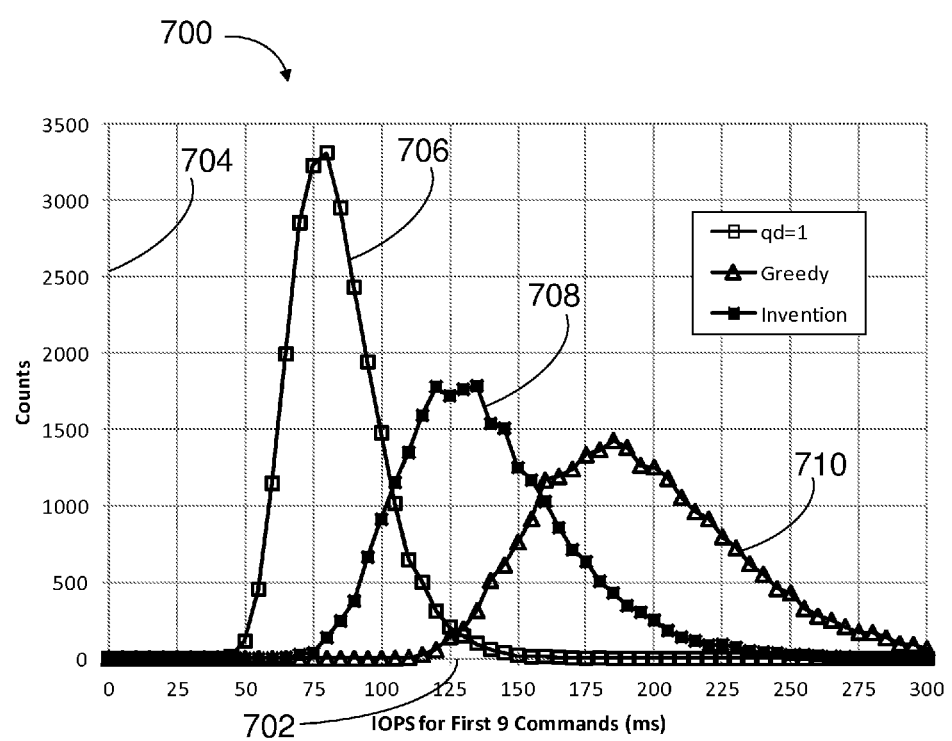
FIG. 7 is a graph illustrating the likelihood of various IOPS values for the three NCQ algorithms in FIGS. 4-6.

FIG. 7 is a graph 700 illustrating the probability 704 of various IOPS values 702 for three NCQ algorithms: qd=1 (curve 706), greedy (curve 710), and according to the invention (curve 708). To generate this graph, 25000 simulation runs were accumulated, with the simple eleven command model in FIGS. 3-6. The vertical axis is counts for each data point (the graph is equivalent to a histogram of counts over each IOPS interval (bin width) of 5, i.e., the left-most bin is 0 to 5, then 5 to 10, etc. The total number of counts for each of the three curves 706, 708, and 710 is thus 25000, distributed over sixty IOPS intervals (bins). For each of the 25000 simulations, (R,A) locations for commands C0-C11 were generated using random numbers, where the Radius was in arbitrary units from 0 to 1 and the Angles ranged from 0° to 360°. Of course in real-life the minimum radius is greater than zero, but this has no effect on the simulation. In this case, the angular density of data was independent of radius, corresponding to higher areal densities nearer the center of the data storage medium and the same readout/writing bit rates for all tracks, independent of radius. Alternative scenarios such as areal densities which do not vary as much across the radius would be expected to produce similar results. All three curves 706, 708, and 710 show wide full-width half-maximum (FWHM) values, with substantial overlap between curves. This does not mean that either the greedy or present invention NCQ algorithms sometimes produce poorer IOPS values than for the qd=1 case—this is essentially never the case. What this overlap illustrates is that even with improved NCQ algorithms, in a fair number of cases, especially for the present invention, the IOPS might be lower than for a small number of other cases where the distribution of commands happens to be more beneficial (i.e., allows more commands per rotation) for employing a qd=1 NCQ algorithm. The significance of this is on the variation in IOPS (for any NCQ algorithm) as a function of the data locations on the medium. This has been addressed in the prior art by strategies for optimal writing of data which may be required to be read-out at, or near to, the same time. All three curves 706, 708, and 710 correspond to just the first nine of the eleven commands in the queue to reduce the "end" effects of exhausting all commands in the queue without replenishment. As discussed above, this has no effect on the qd=1 results, and a potentially significant reduction in IOPS for the greedy algorithm. The effect on the NCQ algorithm of the present invention should be between these extremes.

Prior Art qd=1 Command Sequencing and (R,A) Trajectory

Figure 8:
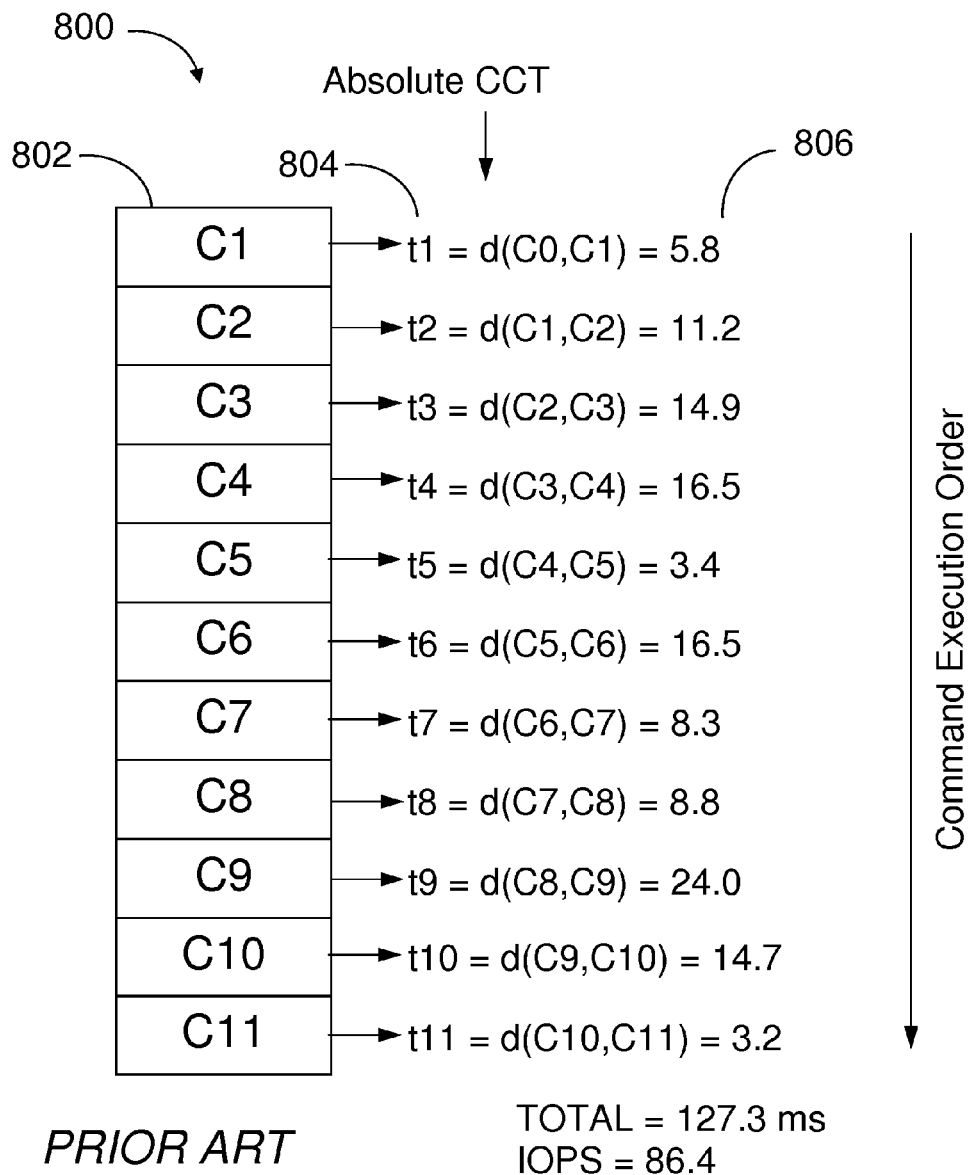
FIG. 8 illustrates the sequencing of commands when executing a prior art qd=1 NCQ algorithm.

FIG. 8 illustrates the sequencing of commands 800 when executing a prior art qd=1 NCQ algorithm. The stack of vertical boxes 802 represents a FIFO command queue, with new commands entering from the bottom and moving upwards as previously-loaded commands are removed from the top when executed. Command C1 is executed first (following C0), with a time-distance value d(C0,C1) of 5.8 ms which is taken from table 300. Subsequent CCTs may be read off of table 300 as discussed above. Clearly, absolute CCTs 806 are ensured since in no case is any command executed out of sequence. For all eleven commands C1-C11, the total execution time is 127.3 ms, giving an IOPS of 86.4. The notation 804 has been introduced where, for example, d(C3, C4)≡t4.

Figure 9:
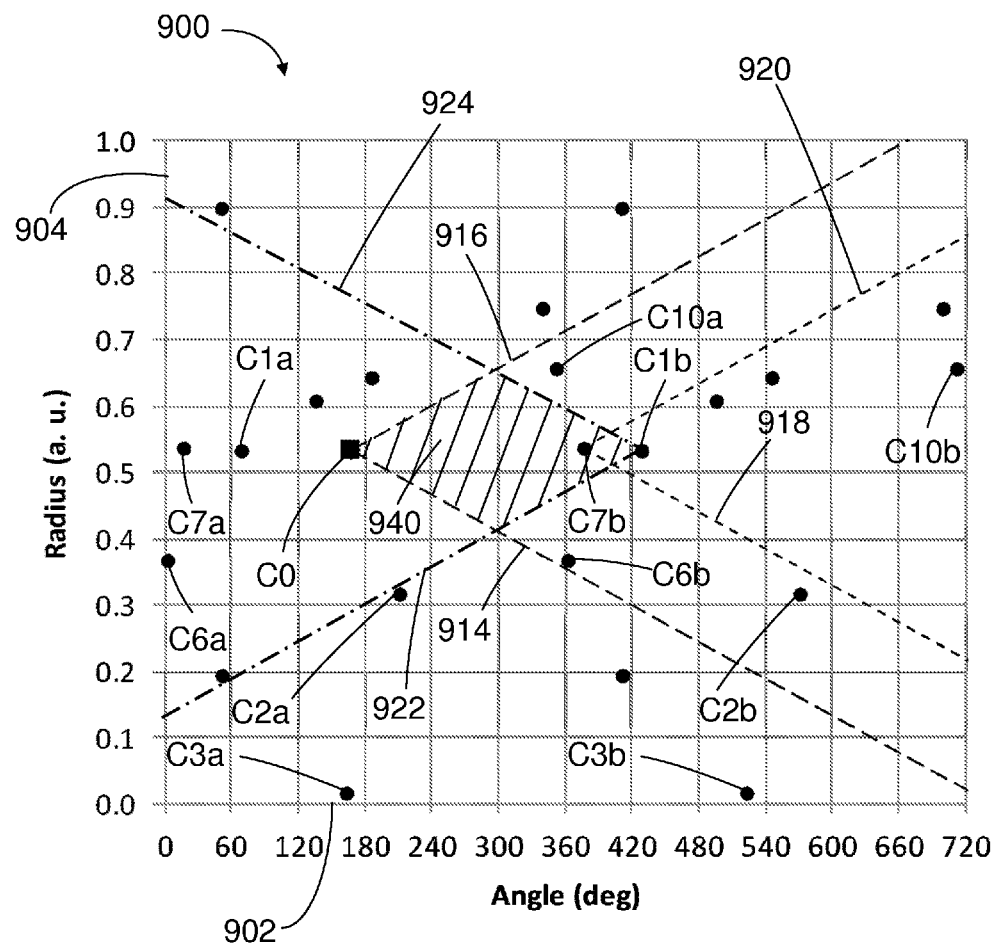
FIG. 9 is a Radius-Angle plot corresponding to the command (R,A) data in FIG. 3, illustrating limits on possible command sequences due to seek times.

FIG. 9 is a Radius-Angle plot 900 corresponding to the R-A data in FIG. 4, illustrating limits on possible command sequences due to seek times. FIG. 9 shows the first two rotations out of the full seventeen rotations illustrated in FIG. 10. Command Angles 902 are plotted relative to command Radii 904, and since two rotations are shown, each command $C_i$ is plotted twice where the suffix "a" on the callout Cia represents the first rotation, and the suffix "b" in Cib is the second rotation. For example, C7a has (R,A)=(0.537,16°) and C7B has (R,A)=(0.537,16°+360°). The rotation on which a particular command is actually executed is a function of the trajectory of the read head back and forth radially across the data storage medium, which is, in turn, determined by the NCQ algorithm applied to the command sequence. Note that since C0 is executed during the first rotation, it is not shown in subsequent rotations on R-A plot 900. FIG. 9 illustrates two categories of commands relative to C0: 1) commands which may be executed after C0 with minimal delay, such as C7b (these commands fall between lines 914 and 916), and 2) commands having an additional delay, such as C3a and C3b which fall outside of line 914 and thus cannot be executed from C0 (i.e., command C3c would be executed after an additional rotation) until at least the third rotation of the data storage medium (see FIG. 10). The two dashed lines 914 (inward radial motion) and 916 (outward radial motion) illustrate the boundaries of a "forward access zone" of commands which can be reached from C0 for the simple case of uniform head velocity—only commands falling within this forward access zone may function as the next command after C0. Note that we have extended the command notation such that, for example, C2a is treated as a different command from C2b, and while command C2a cannot be reached from C0, command C2b can be. This is reflected in table 300 by the addition of a full 8 ms rotation time to the time-distance d(C0,C2). Clearly, for more realistic cases of high read head accelerations and decelerations (which can exceed 500 g), lines 914 and 916 would be curves instead of straight lines, but qualitatively these conclusions are basically the same.

Now, using plot 900, we can better understand the implementation of the present invention with respect to allowed insertions of additional commands prior to the command which would have been executed for a qd=1 NCQ algorithm. Assume C0 has just executed. Then C1 is the next command in sequence, and from plot 900, command C1b would execute because C1a is to the left (i.e., previous in time) from C0. From the plot, all three of commands C7a, C10a and C6b fall within the forward access zone from C0. Extending backwards in angle (and thus in time, also), dashed lines 922 and 924 define the boundaries of a "backward access zone" for C1b. Only commands falling within this backward access zone may function as the previous command to C1b. As can be seen from plot 900, C7b falls within this backward access zone, while both C10a and C6b do not. Thus only the command sequence C0→C7b→C1b satisfies the condition:

$$d(C0,C7b)+d(C7b,C1b)=d(C0,C1b),$$

while C6b and C10a satisfy:

$$d(C0,C6b)+d(C6b,C1c)=d(C0,C1c)=d(C0,C1b)+T_R,$$

$$d(C0,C10b)+d(C10b,C1c)=d(C0,C1c)=d(C0,C1b)+T_R.$$

Where command C1c is not shown in FIG. 9 since it falls within the third rotation of the storage medium (see FIG. 10). Note that in table 300 the suffixes "a", 'b', are omitted since within each row and column, for the d(Ci,Cj) time-distances shown, the suffixes may typically vary. This analysis clarifies the physical basis for which commands may be inserted into the qd=1 command sequence according to the present invention. The intersection 940 (the "C0-C1b inter-command access zone") of the forward access zone defined by lines 914 and 916 and the backward access zone defined by lines 922 and 924 is shown shaded in FIG. 8. For two commands Ci and Cj, every command Ck falling within, and no command outside of, the Ci-Cj inter-command access zone will satisfy this criterion for insertion between Ci and Cj according to the present invention:

$$d(Ci,Ck)+d(Ck,Cj)=d(Ci,Cj).$$

By extension, the criterion for insertion of two commands Cm and Cn between Ci and Cj is then:

$$d(Ci,Cm)+d(Cm,Cn)+d(Cn,Cj)=d(Ci,Cj),$$

where command Cm falls within the Ci-Cn inter-command access zone and command Cn falls within the Cm-Cj inter-command access zone. The criteria and formulas for insertion of three or more commands between Ci and Cj would be clear to those skilled in the art.

FIG. 10 is a Radius-Angle plot 1000 corresponding to execution of a prior art qd=1 NCQ algorithm. The Radii 1004 and Angles 1002 of commands C1-C11 are shown for each rotation of the data storage medium. Thus, for each command Ci, seventeen circles represent Cia, Cib, . . . , Cip, Ciq, for example, for the seventeen times that command Ci potentially passes under the read head. Trajectory 1030 connects C0, C1, C2, . . . , C11 in numerical (FIFO) order as shown—for the particular rotation in which a command is executed, the command circle is a filled-in circle, while unexecuted commands are illustrated as open circles. Inspection of trajectory 1014 reveals the inefficiency of the qd=1 NCQ algorithm, requiring almost seventeen full rotations to execute only eleven commands.

Prior Art Greedy Command Sequencing and (R,A) Trajectory

FIG. 11 illustrates the sequencing of commands 1100 when executing a prior art greedy NCQ algorithm. The stack of vertical boxes 1102 corresponds to an unsequenced FIFO command memory (see block 1904 in FIG. 19) that does not represent the execution order of commands C1-C11 (C0 has just executed, as for FIG. 8). At the right, a command execution sequence (queue) is illustrated, including the CCTs which add up to 69.4 ms, corresponding to a total execution time reduction of 45.5% and an IOPS of 158.8 relative to a qd=1 NCQ algorithm. The arrows connecting the commands in stack 1102 to the commands in the sequenced commands queue (see block 1910 in FIG. 19) represent a re-sequencing of commands according to a prior art greedy NCQ algorithm.

FIG. 12 is a Radius-Angle plot 1200 corresponding to execution of a prior art greedy NCQ algorithm. The Radii 1204 and Angles 1202 of commands C1-C11 are again shown for seventeen rotations of the data storage medium, however, due to the enhanced efficiency of the greedy NCQ algorithm, C1-C11 are all executed within slightly more than nine rotations, thus the remaining nearly eight rotations at the middle and right side of plot 1200 are empty. Of course, assuming that more commands C12, C13, . . . have entered the command memory 1102 during execution of C1 to C11, then these commands C12, C13, . . . would be executed during rotations 9 to 17. Trajectory 1230 connects the commands in the order C0, C10, C11, C4, C5, C7, C1, C6, C2, C9, C3, C8, corresponding to table 500. Comparison of trajectory 1230 to trajectory 1030 clearly shows a substantial improvement in the command execution sequence using the greedy NCQ algorithm. However, a closer examination of the last two commands, C3 and C8, in FIG. 12 indicates that had more commands C12, C13, . . . entered the queue 1102 during the execution of the first nine commands C1-C9, that very likely C3 and C8 would have been delayed. This is especially likely for C8 for which the read head has to traverse nearly the entire radial extent of the data storage medium from R=0.017 (C3) to R=0.900 (C8). Assuming a random Radial coordinate for C12, the probability of C12 falling radially between C3 and C8, i.e., satisfying $0.017 < R_{new} < 0.900$, is $[1-(1-0.900)-0.017]=0.883$. If N>1 commands (C12, C13, . . . ) enter the queue prior to completing C11, the probability of at least one being closer to C3 [i.e., that $d(C3, C_{new}) < d(C3, C8)$] is even higher:

$1-[(1-0.900)-0.017]^N=0.986$ for $N=1$ ($C12$ and $C13$), and $1-[(1-0.900)-0.017]^N=0.998$ for $N=3$ ($C12$ to $C14$).

Command Sequencing and (R,A) Trajectory According to the Present Invention

Figure 13:
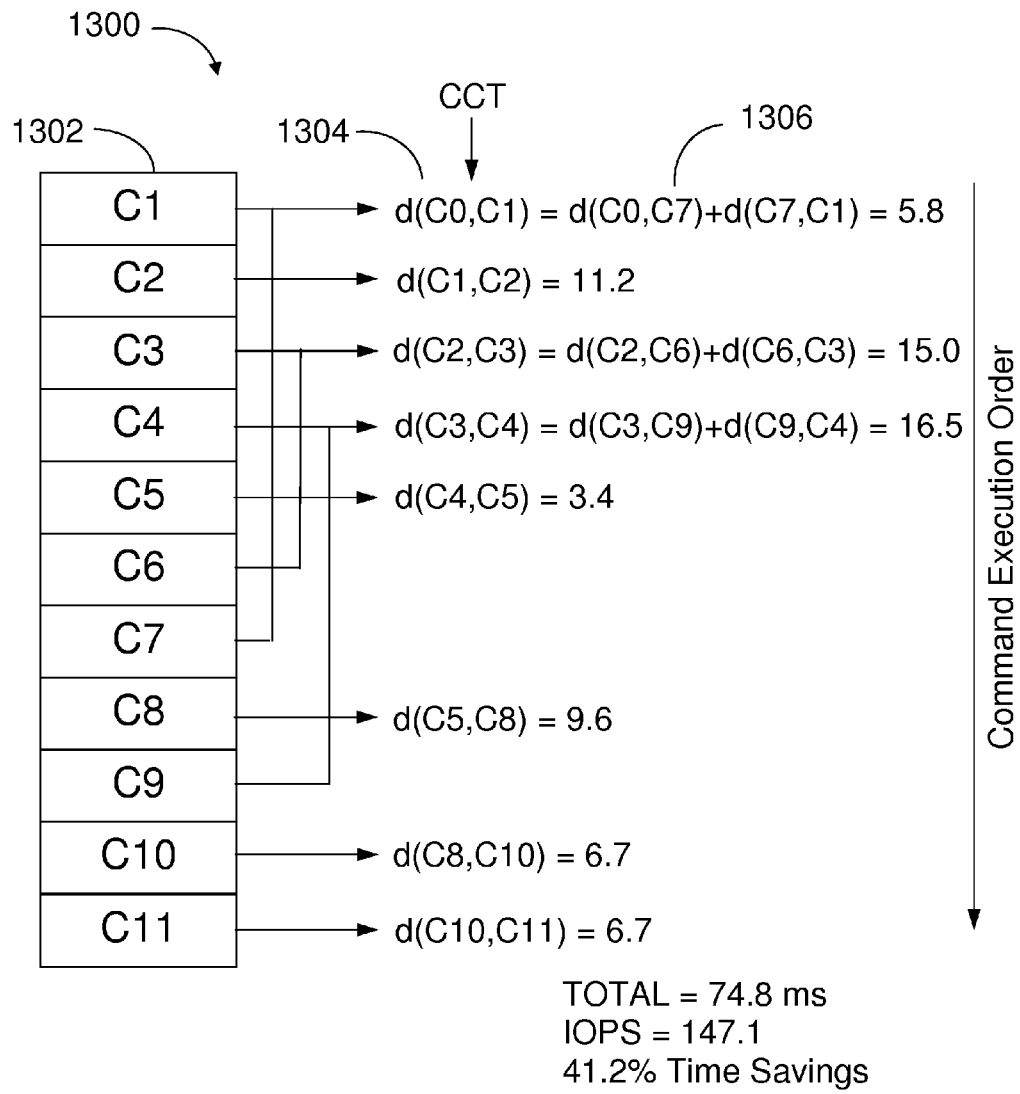
FIG. 13 illustrates the sequencing of commands when executing an NCQ algorithm according to the present invention.

FIG. 13 illustrates the sequencing of commands 1300 when executing an NCQ algorithm according to the present invention. The stack of vertical boxes 1302 corresponds to an unsequenced command memory (see block 1904 in FIG. 19) that does not represent the execution order of commands C1-C11 (C0 has just executed, as for FIGS. 8 and 11). At the right, a command execution sequence (queue) is illustrated, including the CCTs which add up to 74.8 ms, corresponding to a total execution time reduction of 41.2% and an IOPS of 147.1 relative to a qd=1 NCQ algorithm. The arrows connecting the commands in stack 1302 to the commands in the sequenced commands queue (see block 1910 in FIG. 19) represent a re-sequencing of commands according to the NCQ algorithm of the present invention. As was the case for the greedy algorithm modeling in FIGS. 11 and 12, the absence of new commands being added to the queue somewhat distorts the total execution time calculation, but probably not as seriously as for the greedy algorithm—this can be seen by comparison of trajectory 1430 in FIG. 14 to trajectory 1230 in FIG. 12.

Figure 14:
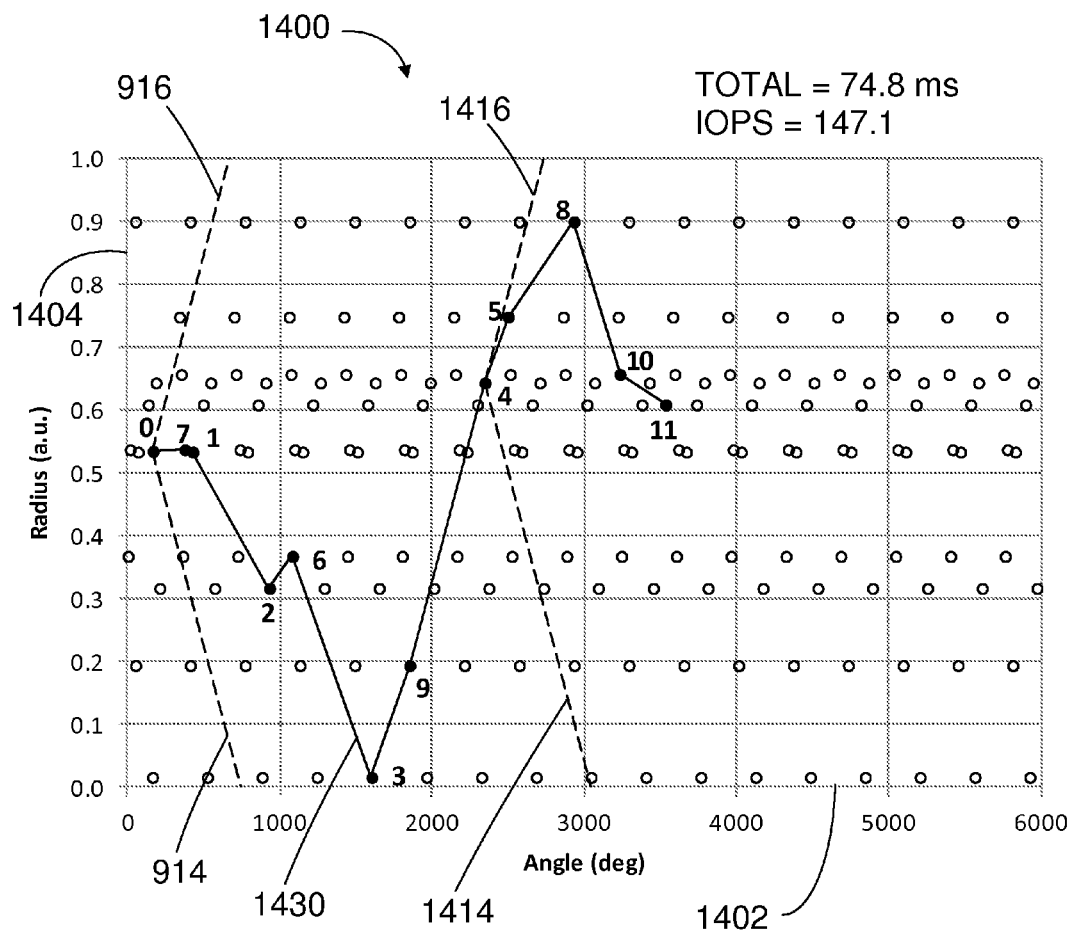
FIG. 14 is a Radius-Angle plot corresponding to execution of an NCQ algorithm according to the invention.

FIG. 14 is a Radius-Angle plot 1400 corresponding to execution of an NCQ algorithm according to the invention. The Radii 1404 and Angles 1402 of commands C1-C11 are again shown for seventeen rotations of the data storage medium, however, due to the enhanced efficiency of the NCQ algorithm of the present invention, C1-C11 are all executed within about ten rotations, thus the remaining nearly seven rotations at the right side of plot 1400 are empty. Of course, as was the case in FIGS. 10 and 12, assuming that more commands C12, C13, . . . have entered the command memory 1102 during execution of C1 to C11, then these commands C12, C13, . . . would be executed during rotations 10 to 17. Trajectory 1430 connects the commands in the order C0, C7, C1, C2, C6, C3, C9, C4, C5, C8, C10, C11, corresponding to table 600. Trajectory 1430 differs substantially from trajectory 1230, yet the total execution times differ by only a small amount. In addition, unlike the case for trajectory 1230, when following trajectory 1430, all commands C1-C11 execute either at the same time, or sooner than, they would execute on trajectory 1030 for the qd=1 NCQ algorithm of the prior art (see FIG. 15). Dashed lines 1414 and 1416 define a forward access zone from C4 containing commands C5, C8, C10, and C11 which have not yet executed Comparison of Command Execution Times for All Three NCQ Algorithms FIG. 15 is a table 1500 comparing the command completion times (CCTs) for the prior art qd=1 and greedy NCQ algorithms with the CCTs for an NCQ algorithm of the present invention. For the present invention, commands C2-C5 execute at the same times as for the qd=1 algorithm, while commands C1, and C6-C11 execute sooner. For the greedy algorithm, commands C1-C3 execute later than for the qd=1 algorithm, while commands C4-C11 execute sooner. Note that this table is exemplary for a single random distribution of 12 (R,A) values for C0-C11. Large numbers of simulation runs have demonstrated that the behavior shown in this example is typical for the three NCQ algorithms.

Command Access Times and IOPS for the NCQ Algorithm of the Present Invention

Figure 16:
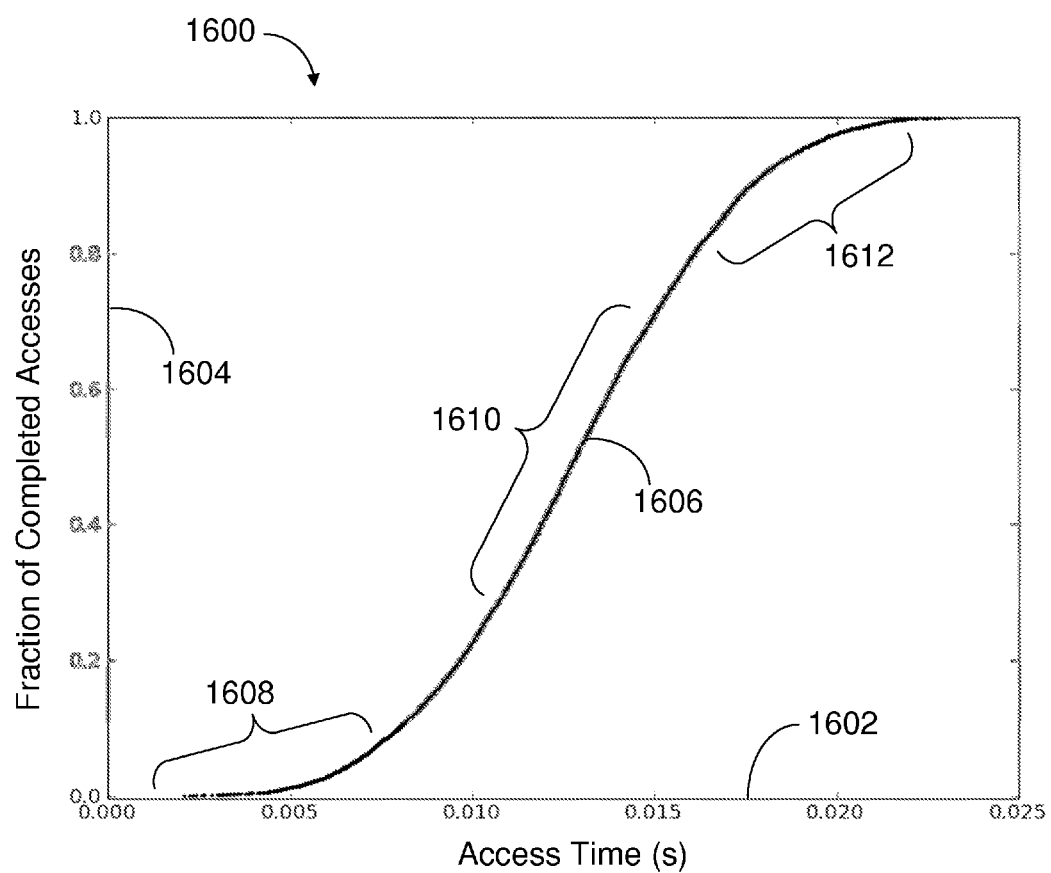
FIG. 16 is a graph of the fraction of completed accesses as a function of the access time for an NCQ algorithm according to the invention.

FIG. 16 is a graph 1600 of the fraction of completed accesses 1604 as a function 1606 of the access time 1602 for an NCQ algorithm according to the invention. Very few commands can be executed for access times 1608 less than about 7.5 ms, while almost all commands have executed for access times 1612 exceeding about 17.5 ms. The great majority of access times 1606 fall within the center region 1610 between about 10.0 to 15.0 ms.

Figure 17:
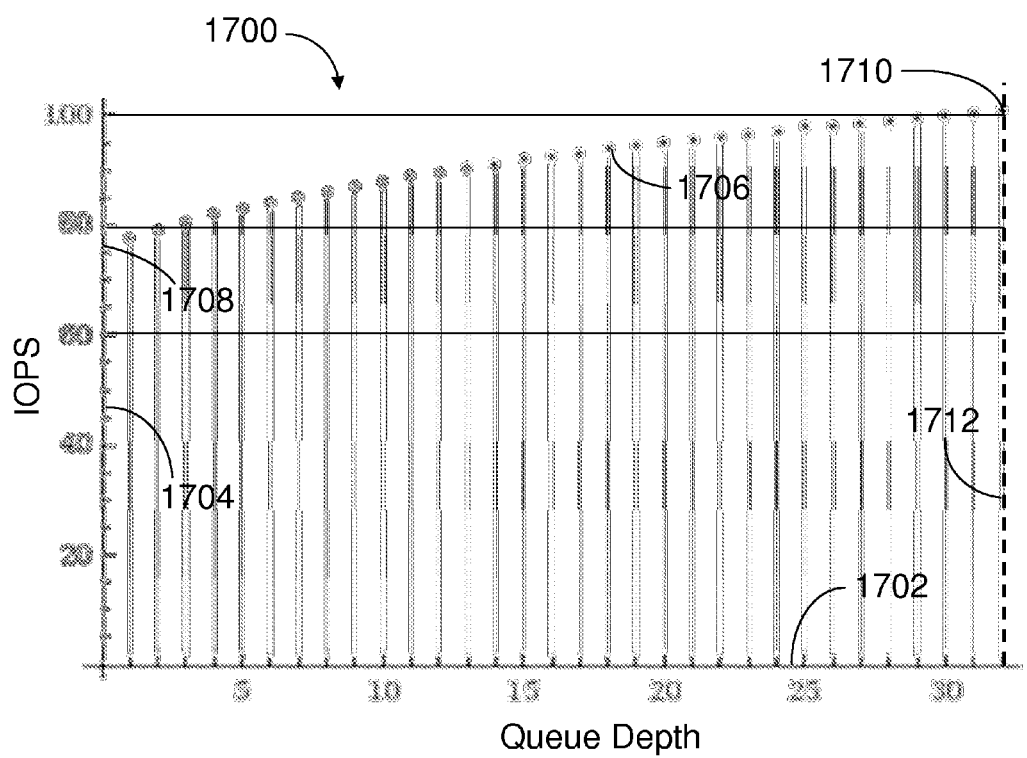
FIG. 17 is a graph of IOPS as a function of the queue depth from 1 to 32 for an NCQ algorithm according to the invention.

FIG. 17 is a graph 1700 of IOPS 1704 as a function of the queue depth 1702 from 1 to 32 for an NCQ algorithm according to the invention. For a queue depth of 1 (qd=1) at callout 1708, the IOPS≈77, while for qd=32, the IOPS increases to about 100 (callout 1710). The slow increase in IOPS between qd=1 and qd=32 (callout 1712) is shown by the sequence of values 1706. For this example, a maximum of one command may be inserted between any two consecutive commands from the qd=1 sequence.

Figure 18:
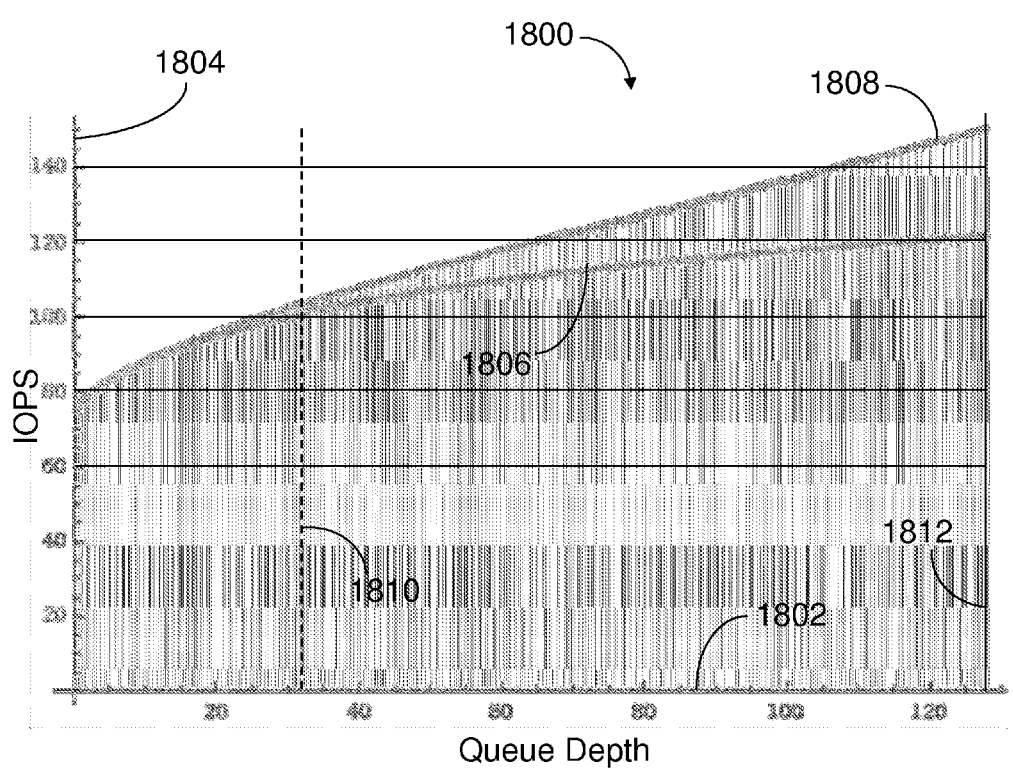
FIG. 18 is a graph of IOPS as a function of the queue depth from 1 to 128 for an NCQ algorithm according to the invention.

FIG. 18 is a graph 1800 of IOPS 1804 as a function of the queue depth 1802 from 1 to 128 for an NCQ algorithm according to the invention. Dashed line 1810 is at qd=32, the right side of graph 1700. The right border 1812 of graph 1800 corresponds to the maximum queue depth of 128 commands. Curve 1806 represents the improvement in IOPS for an NCQ algorithm according to the invention in which a maximum of one command may be inserted whenever possible between any two commands from the original sequence. Curve 1808 shows the added improvement in IOPS obtained by adding more than one command whenever possible between any two consecutive commands from the qd=1 sequence.

NCQ Algorithm Flowchart According to the Present Invention

Figure 19:
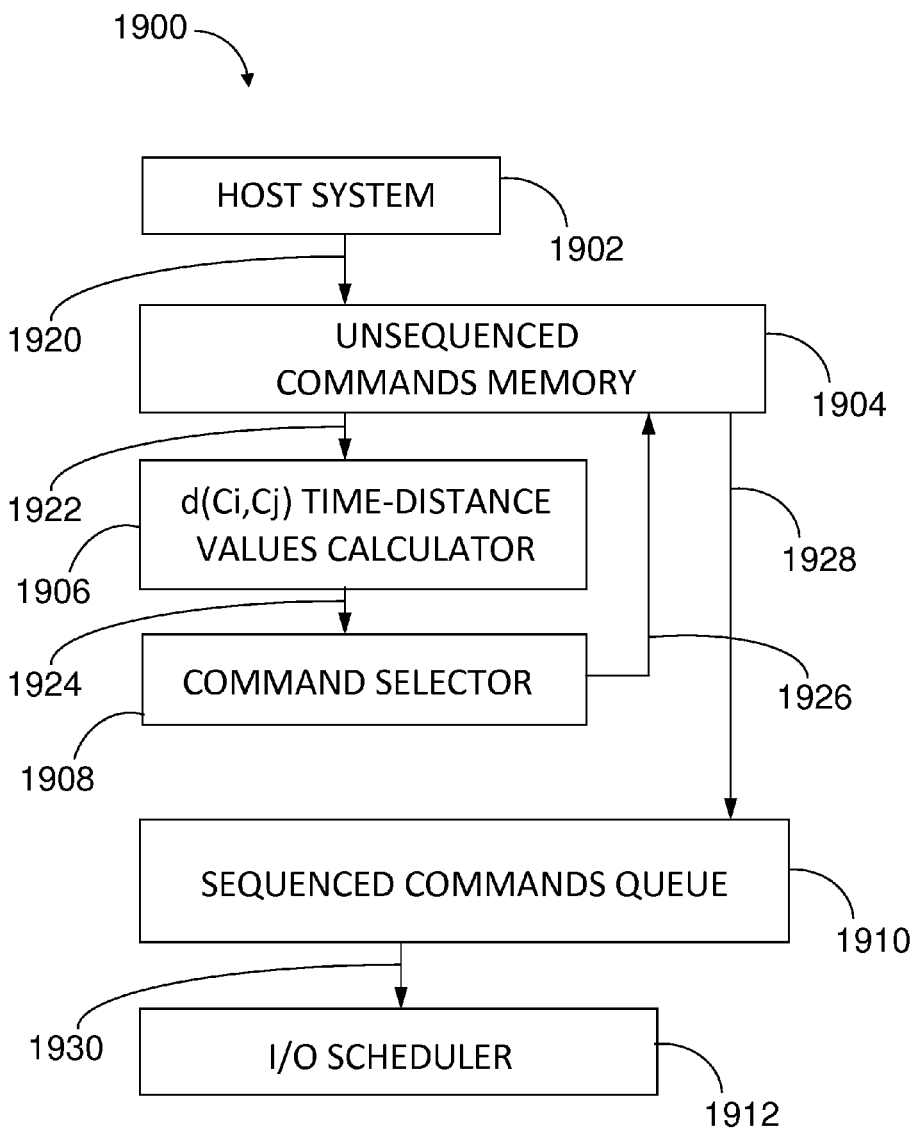
FIG. 19 is a flowchart for implementing an NCQ algorithm according to the present invention.

FIG. 19 is a flowchart 1900 for implementing an NCQ algorithm according to the present invention. A host system 1902 may be a computer such as a personal computer, embedded system, hand-held device, etc., or a DVR, set-top-box, etc. Commands pass along bus 1920 to the unsequenced commands memory 1904 which is random access, enabling access and removal of commands in any order as controlled by the command selector 1908. Commands stored in memory 1904 are read into the d(Ci,Cj) time-distance calculator 1906 through data link 1922 without removing these commands from memory 1904 and without changing their sequence within memory 1904. The time-distance calculator 1906 then determines all the time-distance values corresponding to the M commands stored in memory 1904. When a new command CN (where N=M+1) enters the unsequenced commands memory 1904 (which already contained commands C0-CM) from the host system 1902, calculator 1906 determines values for M+1 time-distances d(Ci,CN) and for another M+1 time-distances d(CN,Ci), where i=0, . . . , M. These time-distance values are then conveyed by datalink 1924 to the command selector 1908 which implements an NCQ algorithm to determine a revised command sequence according to the particular NCQ algorithm. Command selector 1908 may implement a number of prior art NCQ algorithms or the NCQ algorithm of the present invention. Once command selector 1908 has executed the NCQ algorithm, datalink 1926 controls the downloading of commands from the unsequenced commands memory 1904 through datalink 1928 to the sequenced commands queue 1910. The I/O scheduler 1912 then receives these commands through datalink 1930. In some embodiments, command selector 1908 may alternatively implement either an NCQ algorithm according to the present invention or alternative prior art NCQ algorithms, in some embodiments based on the data access requirements for a specific computational task being performed by host system 1902.

Data Storage System Block Diagrams

Figure 20:
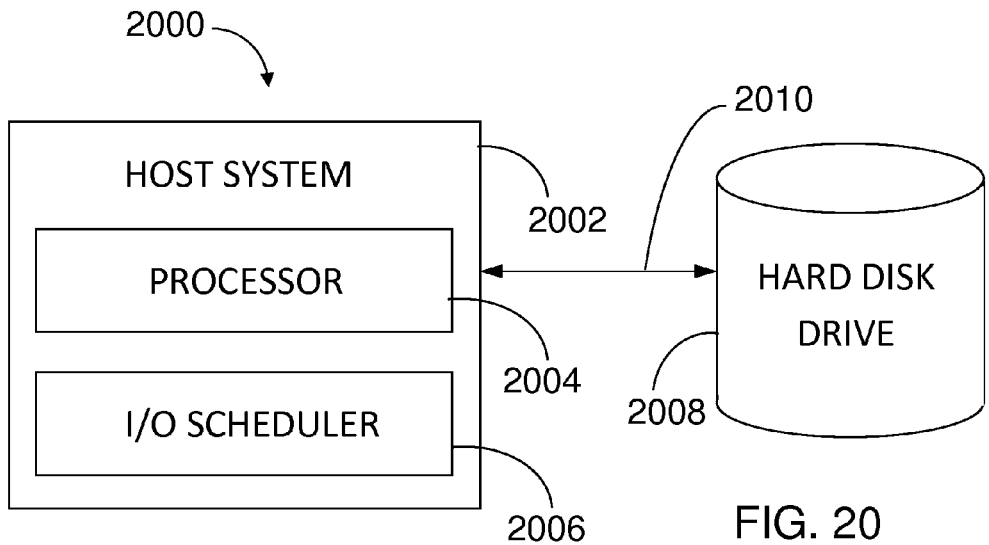
FIG. 20 is a block diagram illustrating a first data storage system that can implement the present invention.

FIG. 20 is a block diagram illustrating a first data storage system 2000 that can implement the present invention. The host system comprises a processor 2004 and an input/output scheduler 2006 as in FIG. 19. The data storage system also includes a data storage device such as a hard disk drive 2008 and a bus 2010. The bus 2010 connects between the host system 2002 and the hard disk drive 2008. The host system 2002 includes an operating system and the I/O scheduler 2006 is within the operating system layer and is typically responsible for deciding when to issue read and write commands to the hard disk drive 2008 through bus 2010.

Figure 21:
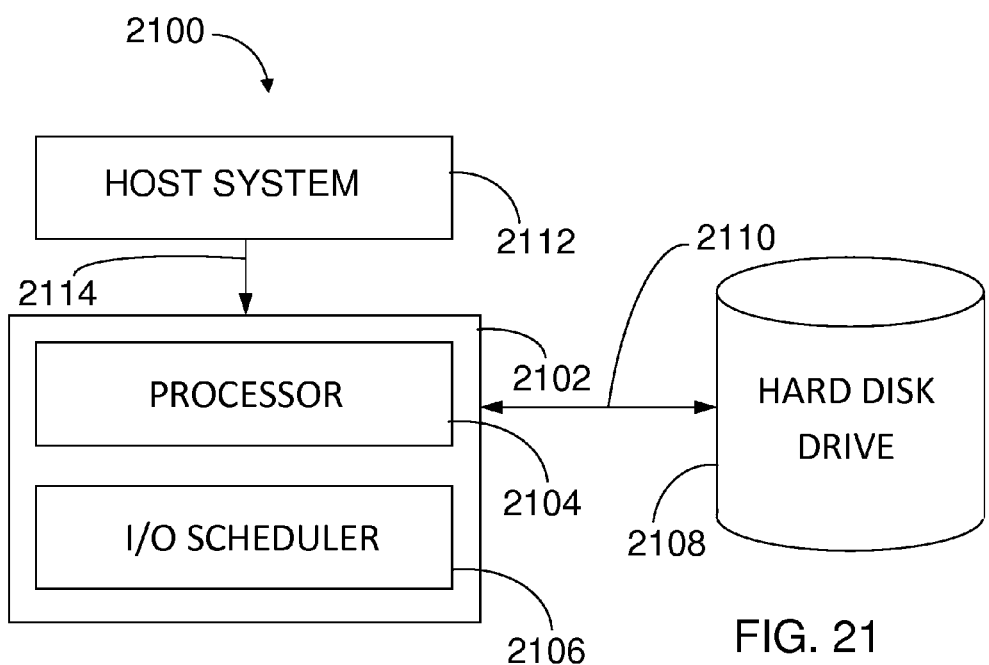
FIG. 21 is a block diagram illustrating a second data storage system that can implement the present invention.

FIG. 21 is a block diagram illustrating a second data storage system 2100 that can implement the present invention. In this embodiment, host system 2112 is separate from processor 2104 and I/O scheduler 2106, which may be contained in a separate enclosure 2102 or within the hard disk drive 2108 connected to the I/O scheduler 2106 through bus 2110. The host system 2112 includes an operating system and the I/O scheduler 2106 is within the operating system layer and is typically responsible for deciding when to issue read and write commands to the hard disk drive 2108 through bus 2110.

Alternative Embodiments within the Scope of the Present Invention

Although the present invention has been described in the context of hard disk drives, the present invention may apply to other types of data storage devices such as network storage devices, solid-state non-volatile memories (i.e., Flash memory), etc., and still remain within the scope of the present invention. It should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A data storage device that accepts read and write commands from a host system, comprising:
    an unsequenced commands memory, configured to store the read and write commands;
    a time-distance calculator, configured to calculate the time-distances between every pair of commands stored in the unsequenced commands memory, each pair comprising first and second commands, wherein the time-distance is defined as the minimum possible time between execution of the first command and then the second command;
    a sequenced commands queue, configured to store commands for processing in a first-in-first-out sequence for processing;
    a command selector, configured to transfer commands from the unsequenced commands memory to the sequenced commands queue according to a predetermined native command queueing algorithm; and
    an input/output scheduler, configured to schedule the sequential execution of the commands stored in the sequenced commands queue.

2. The data storage device as in claim 1, wherein the predetermined native command queueing algorithm comprises the steps of:
    defining a first command;
    defining a second command as the command that was stored in the unsequenced commands memory next after storing of the first command;
    calculating a first time-distance as the time-distance from the first command to the second command;
    defining a third command as a command stored in the unsequenced command memory which is not the same command as the first or second commands;
    calculating a second time-distance as the time-distance from the first command to the third command;
    calculating a third time-distance as the time-distance from the third command to the second command;
    defining a time-distance sum as the sum of the second and third time-distances; and
    comparing the time-distance sum to the first time-distance, wherein:
        if the time-distance sum is greater than the first time-distance, defining a new third command which is not the same as the first or second commands or any previous third commands, and then returning to the calculating of the second time-distance; or
        if the time-distance sum is equal to the first time-distance, sequentially loading the first, third, and second commands into the sequenced command queue.

3. The data storage device as in claim 1, wherein the command selector is configured to execute the native command queueing method.

4. The data storage device as in claim 1, wherein the command selector is configured to execute the native command queueing method alternately with a plurality of other native command queueing methods.

5. The data storage device as in claim 4, wherein the choice of native command queueing method to be executed by the command selector is based on the requirements of a particular data processing application.

6. The data storage device as in claim 4, wherein one queueing method in the plurality of queueing methods is a greedy native command queueing method.

7. The data storage device as in claim 4, wherein one queueing method in the plurality of queueing methods is a queue-depth-of-one native command queueing method.

8. The data storage device as in claim 4, wherein one queueing method in the plurality of queueing methods is a traveling salesman command queueing method.

9. The data storage device as in claim 2, wherein the predetermined native command queueing algorithm further comprises the steps of determining if a multiplicity of commands may be executed between the execution times of the first and second commands.

10. The data storage device as in claim 1 wherein the data storage device is a hard disk drive that implements native command queueing.

11. The data storage device as in claim 1 wherein the data storage device is a solid state non-volatile memory device.

12. The data storage device as in claim 1 wherein the host system generates read and write commands that are transmitted to the data storage device through a SATA bus, and the data storage device is a hard disk drive.

13. The data storage device as in claim 12 wherein the hard disk drive implements native command queueing.

14. A native command queueing algorithm for ensuring absolute command completion times based on queue-depth-of-one and increased input/output operations per second (IOPS), comprising the steps of:
    defining a first command;
    defining a second command as the command that was stored in the unsequenced commands memory next after storing of the first command;
    calculating a first time-distance as the time-distance from the first command to the second command;
    defining a third command as a command stored in the unsequenced command memory which is not the same command as the first or second commands;
    calculating a second time-distance as the time-distance from the first command to the third command;
    calculating a third time-distance as the time-distance from the third command to the second command;
    defining a time-distance sum as the sum of the second and third time-distances; and
    comparing the time-distance sum to the first time-distance, wherein:
        if the time-distance sum is greater than the first time-distance, defining a new third command which is not the same as the first or second commands or any previous third command, and returning to the calculating of the second time-distance; or
        if the time-distance sum is equal to the first time-distance, sequentially loading the first, third, and second commands into a sequenced commands queue.

15. The native command queueing algorithm as in claim 14, further comprising the steps of determining if a multiplicity of commands may be executed between the execution times of the first and second commands.

16. A data storage device that accepts read and write commands from a host system, comprising:
    an unsequenced commands memory, configured to store the read and write commands;
    a time-distance calculator, configured to calculate the time-distances between every pair of commands stored in the unsequenced commands memory, each pair comprising first and second commands, wherein the time-distance is defined as the minimum possible time between execution of the first command and then the second command;
    a sequenced commands queue, configured to store commands for processing in a first-in-first-out sequence for processing;
    a command selector, configured to transfer commands from the unsequenced commands memory to the sequenced commands queue according to a predetermined native command queueing algorithm; and
    an input/output scheduler, configured to schedule the sequential execution of the commands stored in the sequenced commands queue;
wherein the command selector is configured to execute the native command queueing method of claim 14 alternately with a plurality of other native command queueing methods.

17. The data storage device as in claim 16, wherein the choice of native command queueing method to be executed by the command selector is based on the requirements of a particular data processing application.

18. The data storage device as in claim 16, wherein one queueing method in the plurality of queueing methods is a greedy native command queueing method.

19. The data storage device as in claim 16, wherein one queueing method in the plurality of queueing methods is a queue-depth-of-one native command queueing method.

20. The data storage device as in claim 16, wherein one queueing method in the plurality of queueing methods is a traveling salesman command queueing method.

* * * * *

UNITED STATES PATENT AND TRADEMARK OFFICE
CERTIFICATE OF CORRECTION

PATENT NO. : 8,838,841 B2
APPLICATION NO. : 13/561156
DATED : September 16, 2014
INVENTOR(S) : Cyril Guyot It is certified that error appears in the above-identified patent and that said Letters Patent is hereby corrected as shown below:

In the Specification

Column 9, line 36, please delete "1 - [ (1-0.900) - 0.017] N = 0.986 for N = 1 (C12 and C13), and", and insert -- N = 0.986 for N = 2 (C12 and C13), and --.

In the Claims

Column 12, line 67, claim 3, please correct claim 3 to read -- 3. The data storage device as in claim 1, wherein the command selector is configured to execute the native command queueing method of claim 14. --, and delete "The data storage device as in claim 1, wherein the command selector is configured to execute the native command queueing method.".

Column 13, line 3, claim 4, please correct claim 4 to read -- 4. The data storage device as in claim 1, wherein the command selector is configured to execute the native command queueing method of claim 14 alternately with a plurality of other native command queueing methods. --, and delete "The data storage device as in claim 1, wherein the command selector is configured to execute the native command queueing method alternately with a plurality of other native command queueing methods.".

Signed and Sealed this
Twelfth Day of May, 2015

Michelle K. Lee
*Director of the United States Patent and Trademark Office*